Figure 1:
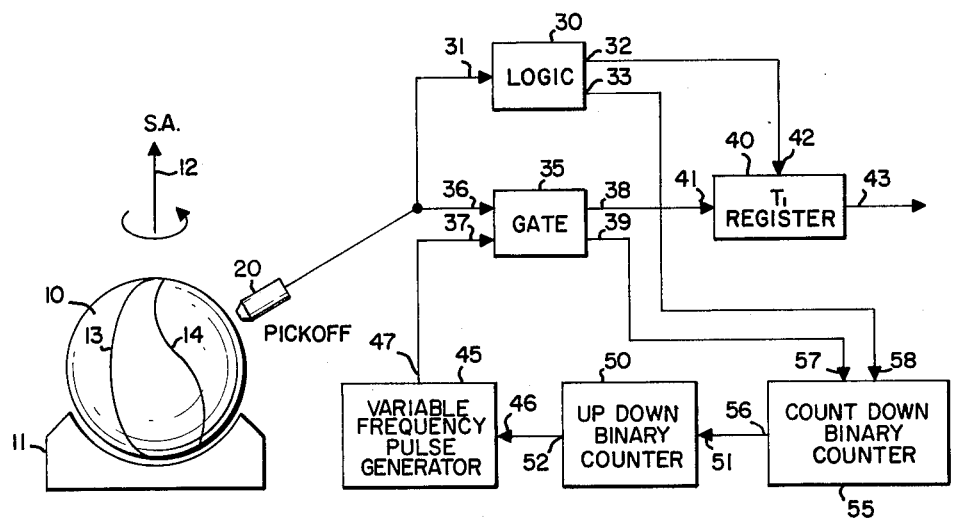

July 26, 1966 P. G. SAVAGE 3,263,065
PULSE RATIO DETECTOR

Filed June 28, 1965 2 Sheets-Sheet 1

FIG. I

INVENTOR.
PAUL G. SAVAGE
BY
ATTORNEY

July 26, 1966 P. G. SAVAGE 3,263,065
PULSE RATIO DETECTOR
Filed June 28, 1965 2 Sheets-Sheet 2

INVENTOR.
PAUL G. SAVAGE
BY
Roger W. Jensen
ATTORNEY

United States Patent Office 3,263,065
Patented July 26, 1966

3,263,065
PULSE RATIO DETECTOR
Paul G. Savage, Plymouth, Minn., assignor to Honeywell Inc., Minneapolis, Minn., a corporation of Delaware
Filed June 28, 1965, Ser. No. 467,526
5 Claims. (Cl. 235—92)

The present invention pertains to computing means and more particularly it pertains to means for determining the ratio of two time intervals without the requirement for the usual division operation.

In the present illustrative example disclosed here, the invention finds its application in a pickoff arrangement for a gyroscopic instrument wherein the inertial member is universally supported for three degrees of freedom. The inertial member is given an angular velocity about a spin axis which maintains a constant orientation in the inertial space regardless of changes in the attitude of its support. A pickoff is mounted in rigid relationship with the support and is adapted to observe a pattern on the inertial member. In the embodiment disclosed herein, the inertial member has spherical geometry and the pattern is comprised of at least two lines. Its geometry and the nature of its support make the member susceptible to an analogy with the earth and nomenclature such as "equator," "latitude," "longitude," "poles," etc. is often used to facilitate description. It will be used here.

The line pattern geometry can take many forms. In the particular example chosen for discussion here, one of the lines of the pattern lies along a great circle on the spherical member, the particular great circle being coplanar with the spin axis and therefore intersecting the spin axis at two points on the member. These two points of intersection will be called "poles." The line, however, does not extend along the entire extent of the great circle, but covers a segment not exceeding 180° and preferably does not intersect with either of the two poles.

The pickoff is trained on the member and observes this line once each revolution of the member. Because the line lies along a great circle which intersects the spin axis, the interval between two consecutive observations of this line is independent of the latitude observed by the pickoff. The time interval is dependent only on the angular velocity of the member relative to its support. If the relative angular velocity of the member is constant, the line will be observed by the pickoff at precisely equally spaced points in time.

The second line is not colinear with a great circle which would pass through the poles. Rather, the second line is a segment extending in a general direction of such a great circle but varying in its angular separation from the first line as a function of latitude of the member. The time interval between two consecutive observations of this second line, therefore, is not dependent only on the angular velocity of the member, but also on the latitude observed by the pickoff.

It becomes clear from the above discussion that the latitude of the member observed by the pickoff can be determined by computing the ratio of the time elapsing between the observations of the first and the second lines and the time required to complete the entire revolution of the member, which corresponds to the time elapsing between two consecutive observations of the first line. To compute this ratio it has been thought necessary to accomplish an operation of division. The purpose of the present invention is to eliminate the need for this division operation.

It is therefore an object of the present invention to provide means for determining a ratio between two intervals of time without the need for an operation of division.

More particularly, it is an object of the present invention to provide a simple readout logic for a gyroscopic instrument.

Figure 2:
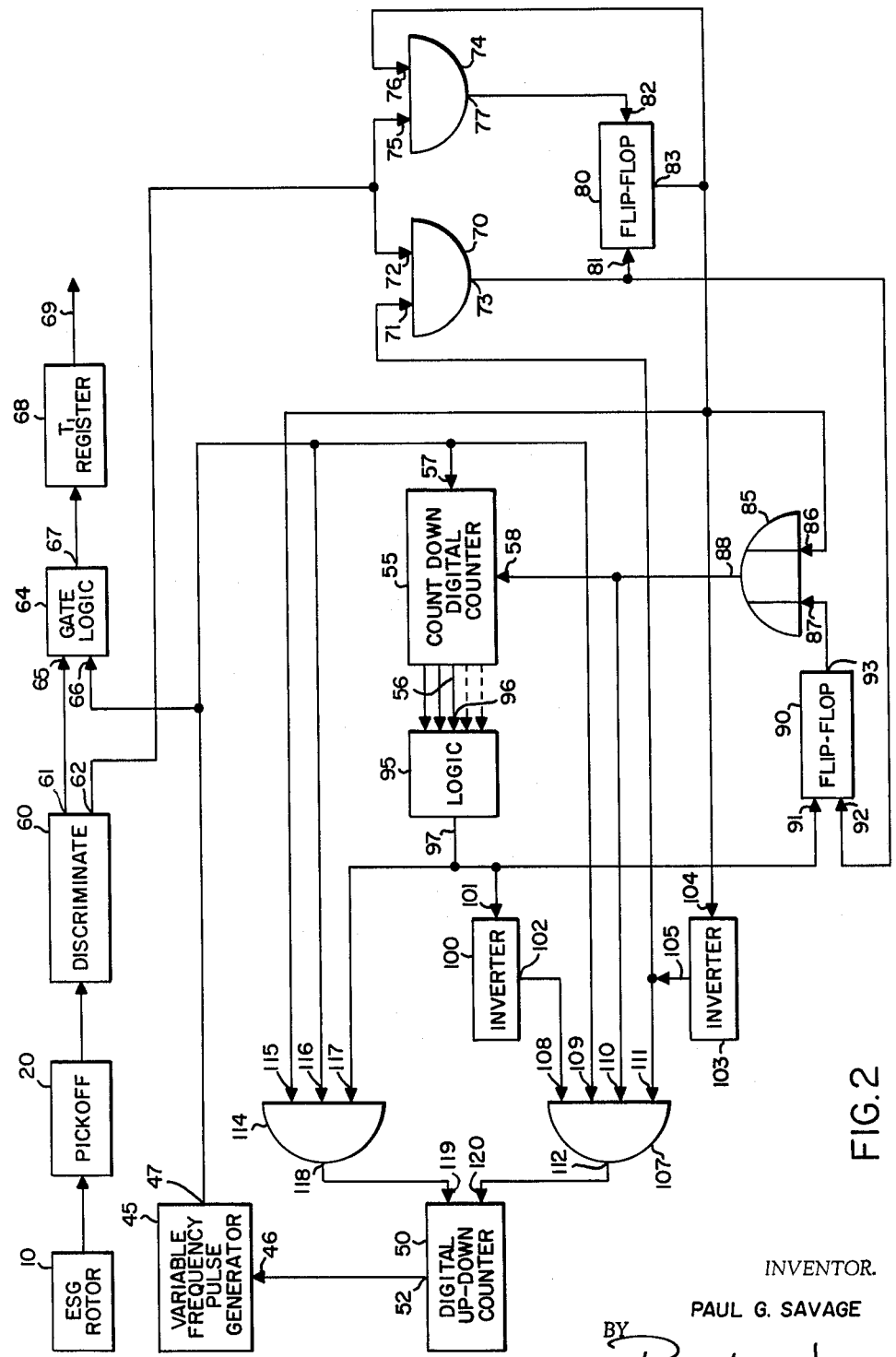

These and further objects of my invention will be apparent to those skilled in the art upon consideration of the accompanying specification, claims, and drawings of which:

FIGURE 1 is a block diagram of a pickoff readout arrangement incorporating the present invention; and FIGURE 2 is a logic circuit showing in detail one possible embodiment according to my invention wherein the frequency of a variable frequency pulse generator is controlled as a function of time between consecutive input pulses.

Referring now to FIGURE 1, a spherical inertial member 10 is supported on a base 11 and adapted for rotation about a spin axis 12. Inertial member 10 has on its surface a pattern comprised of a pair of lines 13 and 14. A pickoff 20 is positioned adjacent to member 10 and adapted to observe the surface of member 10 at an angle to spin axis 12. The output of pickoff 20 is fed in parallel to an input 36 of a gate network 35 and an input 31 of a logic network 30. Logic network 30 further has a pair of outputs 32 and 33 and gate network 35 further has an input 37 and a pair of outputs 38 and 39. Output 32 of logic 30 is connected to an input 42 of a register 40. Register 40 further has an input 41 and an output 43. Input 41 of register 40 is connected to receive a signal from output 38 of gate network 35. Output 33 of logic network 30 is connected to an input 58 of a count-down binary counter 55. Counter 55 also has an input 57 and an output 56. Input 57 of counter 55 is connected to output 39 of gate network 35. Output 56 of counter 55 is connected to an input 51 of an up-down binary counter 50. Counter 50 further has an output 52 connected to an input 46 of a variable frequency pulse generator 45. Pulse generator 45 has an output 47 connected to input 37 of gate network 35. At output 43 of register 40 appears a signal indicative of the latitude on member 10 observed by pickoff 20.

FIGURE 2 illustrates a detailed schematic for regulating the frequency of variable frequency pulse generator 45 as a function of time separation between two consecutive pulses. The signal generated by the pattern on ESG rotor 10 is detected by pickoff 20 and transmitted to a discriminator 60. Discriminator 60 has a pair of outputs 61 and 62. The signal appearing at output 62 is comprised of a series of pulses, the time between each two consecutive pulses representing a revolution of the ESG rotor.

Output 62 of discriminator 60 is connected to an input 72 of an AND gate 70 and also to an input 75 of an AND gate 74. AND gate 70 further has an input 71 and an output 73 and AND gate 74 further has an input 76 and an output 77. Output 73 of gate 70 is connected to an input 81 of a flip-flop 80 and also to an input 92 of a flip-flop 90. Flip-flop 80 further has an input 82 and an output 83. Input 82 of flip-flop 80 is connected to output 77 of AND gate 74.

Flip-flop 90 has also an input 91 and an output 93. Output 93 of flip-flop 90 is connected to an input 87 of an OR gate 85 which further has an input 86 and an output 88. Output 83 of flip-flop 80 is connected to input 76 of AND gate 74 and also to an input 104 of an inverter 103. Inverter 103 has an output 105 connected to input 71 of AND gate 70 and also to an input 111 of an AND gate 107. AND gate 107 has also inputs 108, 109, and 110 and an output 112.

Output 88 of OR gate 85 is connected to an input 58 of a count-down digital counter 55. Counter 55 also has an input 57 and a plurality of outputs 56. Outputs 56 of counter 55 are connected to a plurality of inputs 96 of a logic circuit 95. Counter 55 is of the well-known type, comprised of a number of binary stages which are capable of possessing either a "0" or a "1" state. Logic circuit 95 has an output 97 connected to inputs 91 of flip-flop 90, to an input 101 of an inverter 100 and to an input 117 of an AND gate 114. Inverter 100 has an output 102 connected to input 108 of AND gate 107. AND gate 114 has additional inputs 115 and 116 and also an output 118.

Output 112 of AND gate 107 is connected to an input 120 of a digital up-down counter 50. Counter 50 further has an input 119 connected to output 118 of an AND gate 114, and an output 52 connected to an input 46 of a variable frequency pulse generator 45. Pulse generator 45 has an output 47 connected to input 57 of digital counter 55, input 109 of AND gate 107, input 116 of AND gate 114, and input 66 of a gate logic 64. Gate logic 64 further has an input 65 connected to output 61 of discriminator 60 and an output 67 connected to the input of a register 68. Register 68 has an output 69.

OPERATION

Pickoff 20 observes the pattern comprised of line segments 13 and 14 on inertial member 10 as member 10 rotates about spin axis 12. During each revolution, pickoff 20 observes each of the two line segments. The time separation between the crossings of the two lines varies as a function of the latitude which pickoff 20 observes. The pickoff output signal appears in the form of an electric pulse corresponding to each line crossing. The signal from the output of pickoff 20 is applied to input 36 of gate 35 and input 31 of logic 30. At input 37 of gate 35 is applied a signal from output 47 of variable frequency pulse generator 45.

Responsive to signals from the pickoff 20, gate 35 allows the signal from pulse generator 45 to pass through to output 39 during a time interval from a first crossing of the first line segment until a subsequent crossing of the first line segment. It then allows no signal to appear at output 39 until a third crossing of the first line segment and again removes the signal after the fourth crossing. Thus on every alternate revolution of member 10 the signal from variable frequency pulse generator 45 appears at output 39 of gate 35 for a length of time required for one revolution.

At output 38 of gate 35 the signal from pulse generator 45 is allowed to appear after the crossing of the first line segment under pickoff 20 and is removed at the crossing of the second line segment 13. The pulses from output 38 are fed into input 41 of register 40. The number of pulses received by register 40 between the two consecutive pulses from pickoff 20 are indicative of the latitude on member 10 observed by pickoff 20.

The signal from output 39 of gate 35 is applied to input 57 of count-down binary counter 55. Counter 55 compares the number of pulses generated in one revolution of member 10 and compares this number to a predetermined number. If the number counted by counter 55 exceeds the predetermined number, the excess is spilled out into up-down binary counter 50, reducing the count in counter 50. If the number counted by counter 55 is less than the predetermined number, then the number of pulses representing the deficiency appear at output 56 and are applied at input 51 of counter 50, effecting an increase in counter 50. The signal appearing at output 52 of counter 50 is a D.C. signal proportional to the count in counter 50. The frequency of the signal produced by pulse generator 45, which appears at its output 47, is proportional to the amplitude of the D.C. signal at input 46.

The output of pickoff 20 is also supplied to input 31 of logic network 30 which from its output 32 applies a signal to input 42 of register 40 to reset register 40 before the beginning of the counting cycle. At output 33 logic network 30 provides a signal, which is applied to input 58 of counter 55, to reset counter 55 at the beginning of each counting cycle.

The signal at output 56 of counter 55 appears at the end of each counting cycle as long as there is a variation from the predetermined value. This in turn varies the count in up-down counter 50 and consequently varies the D.C. level of the signal at output 52 of counter 50. Since the frequency of pulse generator 45 is dependent upon the amplitude of the D.C. signal applied to its input 46, the frequency of pulse generator 45 will change until the number of pulses it produces during one revolution of the member 10 will equal exactly the predetermined value with which the count of counter 55 is compared. Since the number of pulses produced by generator 45 between two consecutive crossings of the first line segment under pickoff 20 remains constant regardless of variations in speed of member 10, it becomes apparent that the number of pulses counted between the crossings of the first and the second line segments is directly indicative of the latitude observed by pickoff 20. Division by a constant is meaningless and the division process can therefore be eliminated.

FIGURE 2 shows in more detail how the regulation of the pulse generator frequency is accomplished. Assume that in FIGURE 2 flip-flops 80 and 90 are in reset position. Then AND gates 74, 107, and 114 are closed and AND gate 70 is open.

Consider a pulse appearing at output 62 of discriminator 60. The pulse passes through AND gate 70 setting flip-flop 80 and the output of flip-flop 80 becomes "1." This signal also appears at input 86 of OR gate 85 and is passed through to input 58 of counter 55 and also to input 110 of AND gate 107. The signal at input 58 releases the hold on counter 55 and allows it to receive signals from pulse generator 45 and begins counting down. Also the output of inverter 103 is "0," thereby holding AND gate 107 closed and closing AND gate 70. Logic network 95 provides an output at its output 97 only when all of the stages of counter 55 are "0." Thus until the count in counter 55 is zero there is no signal at output 97 and at input 117 of AND gate 114, maintaining AND gate 114 in a disabled condition. At the same time signal from variable frequency pulse generator 45 is applied at input 57 of counter 55 and causes counter 55 to count down from a predetermined value $N^c$. The signal from output 83 of flip-flop 80 is also applied to input 76 of AND gate 74 and sets AND gate 74 into an open condition.

Consider the case where the total number of pulses during a revolution of inertial member 10 exceeds the preset value $N^c$. In that situation, counter 55 counts down to zero before another pulse appears at output 62 of discriminator circuit 60. When the count of counter 55 becomes zero, all of the inputs 96 of logic network 95 become zero and a signal appears at output 97. This signal is applied in turn to input 117 of AND gate 114, enabling AND gate 114. Since now signals appear at both inputs 115 and 117 of AND gate 114, the pulse train from pulse generator 45 applied at input 116 is allowed to pass through to its output 118 and to input 119 of up-down counter 50. The effect of these pulses is to decrease the count in counter 50 and in turn decrease its D.C. signal amplitude at output 52.

The signal appearing at output 97 of logic 95, after counter 55 counts down to zero, also resets flip-flop 90, removing the signal from input 87 of OR gate 85. Input 58 of counter 55, however, remains energized because the signal is still present at input 86 of OR gate 85. Throughout the operation, so far, AND gate 107 has been closed because of lack of an energizing signal at input 111 which is controlled from output 105 of inverter 103.

As a second pulse appears at output 62 of discriminator network 60 it passes through AND gate 74, resetting flip-flop 80 and removing a signal from its output 83.

This removes the signal from input 115 of AND gate 114, disabling AND gate 114. The signal is also removed from input 86 of OR gate 85 and in turn from input 110 of AND gate 107 and input 58 of counter 55. Upon removal of the signal from input 58 of counter 55, counter 55 is recycled and reset to the predetermined count $N^c$. As soon as AND gate 114 is closed, the counting in up-down counter 50 stops and the conditions are back to the original state except that the count in counter 50 has been reduced by the number of pulses produced by generator 45 between two consecutive pulses at output 62 of discriminator 60 which exceed the predetermined value in counter 55. This in turn reduces the output from counter 50 during the next cycle, thereby lowering the frequency of pulse generator 45.

Consider now the case where the total number of pulses produced during one revolution of inertial member 10 is less than the predetermined value $N^c$ Then a second pulse is produced at output 62 of discriminator circuit 60 before the count down in counter 55 reaches zero. When this second pulse enters, it passes through AND gate 74 resetting flip-flop 80 and removing the signal output 83. Since counter 55 has not yet counted down to zero, the signal at output 97 of logic 95 still stays at zero. Thus AND gate 114 remains in its disabled state and flip-flop 90 remains in its set condition. The signal remains at input 58 of counter 55 and the count down continues.

At the same time when the signal is removed from input 104 of inverter 103, a signal appears at output 105 and energizes input 111 of AND gate 107. Input 110 of AND gate 107 remains energized from output 88 of OR gate 85 and input 108 of gate 107 remains energized from output 102 of inverter 100. Thus AND gate 107 is opened and pulses applied from output 47 of pulse generator 45 at input 109 of AND gate 107 are allowed to pass through to output 112 and to input 120 of up-down counter 50. Counter 50 is counted up by an amount by which the predetermined number $N^c$ exceeds the number of pulses produced during one revolution of inertial member 10.

When counter 65 reaches zero, a signal appears at output 97 of logic 95 and results in the removal of the signal from output 102 of inverter 100 and input 108 of AND gate 107. AND gate 107 is thus disabled and the counting in counter 50 is stopped. At the same time flip-flop 90 is reset, removing the signal from input 58 of counter 55, and causing counter 55 to recycle. The conditions of the system are now the same as they were at the beginning, except that the count in counter 50 has increased with the corresponding increase in its D.C. output. This in turn increases the frequency of variable frequency pulse generator 45 by a desired amount.

Many variations and embodiments are possible within the spirit of this invention. It is therefore understood that the particular embodiment shown here is for illustration purposes only and that the present invention is limited only by the scope of the appended claims.

What is claimed is:

1. Apparatus for varying the frequency of a variable frequency oscillator as a function of the time elapsing between consecutive pulses in a series of such pulses, said apparatus comprising:
   a variable frequency oscillator having an input and an output, the frequency of the signal at its output being proportional to the amplitude of a D.C. signal at its input;
   a source of reference pulses;
   counting means connected to said oscillator and to said source of pulses to count the number of pulses received from said oscillator between a pair of consecutive pulses from said source of reference pulses;
   comparing means connected to said counting means to provide an output D.C. signal which is lesser than a bias value if the number of pulses counted by said counter exceeds a predetermined value and to provide a D.C. signal which is greater than said bias value if the number of pulses counted by said counter is lesser than said predetermined value; and
   means connecting the output of said comparing means to the input of said oscillator means.

2. Apparatus for determining the ratio of a second time interval to a first time interval, said apparatus comprising:
   a variable frequency oscillator having an input and an output, the frequency of the signal at its output being proportional to the amplitude of a D.C. signal at its input;
   a first counting means connected to said oscillator means to count the number of pulses received from said oscillator during said first time interval;
   comparing means connected to said first counting means to provide an output D.C. signal which is a function of the difference between the number of pulses counted by said counter and a predetermined number;
   means connecting the output of said comparing means to the input of said oscillator means; and
   a second counting means connected to the output of said oscillator to count the number of pulses produced by said oscillator during a second time interval, said number counted being a direct indication of the ratio of said second time interval to said first time interval.

3. Apparatus for determining the ratio of a second time interval to a first time interval, said apparatus comprising:
   a variable frequency oscillator having an input and an output, the frequency of the signal at its output being proportional to the amplitude of a D.C. signal at its input;
   a first counting means connected to said oscillator means to count the number of pulses received from said oscillator during said first time interval;
   comparing means connected to said first counting means to provide an output D.C. signal which is lesser than a bias value if the number of pulses counted by said counter exceeds a predetermined number and to provide a D.C. signal which is greater than said bias value if the number of pulses counted by said counter is lesser than said predetermined value;
   means connecting the output of said comparing means to the input of said oscillator means; and
   a second counting means connected to the output of said oscillator to count the number of pulses produced by said oscillator during a second time interval, said number counted being a direct indication of the ratio of said second time interval to said first time interval.

4. Apparatus for determining the ratio of a second time interval to a first time interval, said apparatus comprising:
   a variable frequency oscillator having an input and an output, the frequency of the signal at its output being a function of the signal at its input;
   means for measuring a first time interval;
   a first counting means connected to receive the signal from said variable frequency oscillator and from said means for measuring said first time interval, said first counting means being adapted to count the number of pulses it receives from said oscillator during said first time interval;
   a comparing means connected to receive the signal from said first counting means and to compare the number of pulses counted by said first counting means during said first time interval to a predetermined number and to provide an output signal which is a function of the difference between said number counted and said predetermined number;

means connecting the output of said comparing means to the input of said variable frequency oscillator means; and a second counting means connected to receive at its input the signal from said variable frequency oscillator means to count the number of pulses produced by said oscillator during a second time interval, said number being indicative of the ratio of said second time interval to said first time interval.

5. Apparatus for determining the ratio of a second time interval to a first time interval, said apparatus comprising:

a variable frequency oscillator having an input and an output, the frequency of the signal at its output being proportional to the amplitude of a D.C. signal at its input;

means for measuring a first time interval;

a first counting means connected to receive the signal from said variable frequency oscillator and from said means for measuring said first time interval, said first counting means being adapted to count the number of pulses it receives from said oscillator during said first time interval;

a comparing means connected to receive the signal from said first counting means and to compare the number of pulses counted by said first counting means during said first time interval to a predetermined number and to provide an output D.C. signal which is a function of the difference between said number counted and said predetermined number;

means connecting the output of said comparing means to the input of said variable frequency oscillator means; and a second counting means connected to receive at its input the signal from said variable frequency oscillator means to count the number of pulses produced by said oscillator during a second time interval, said number being indicative of the ratio of said second time interval to said first time interval.

References Cited by the Examiner
UNITED STATES PATENTS

| 2,951,986 | 9/1960 | Gordon | 235—92 |
| 3,019,346 | 1/1962 | Laycak | 235—92 |

FOREIGN PATENTS

| 747,558 | 3/1956 | Great Britain. |

DARYL W. COOK, *Acting Primary Examiner.*

J. F. MILLER, *Assistant Examiner.*